March 6, 1928.  A. J. TSCHIDA ET AL  1,661,398

CABLE SUPPORT BRACKET

Filed March 11, 1927

INVENTORS:
Adolph J. Tschida.
Theodore T. Tschida
BY David E. Carlsen
ATTORNEY.

Patented Mar. 6, 1928.

1,661,398

UNITED STATES PATENT OFFICE.

ADOLPH J. TSCHIDA AND THEODORE T. TSCHIDA, OF ST. PAUL, MINNESOTA.

CABLE-SUPPORT BRACKET.

Application filed March 11, 1927. Serial No. 174,442.

Our invention relates to an improved cable hanger bracket particularly useful for overhead telephone cable hanging purposes. The main object of the invention is to provide a simple, highly efficient and inexpensive bracket, the use of which prevents accidental falling or displacement of suspended cable lines. Further objects will appear in the following description, reference being had to the accompanying drawing in which:—

Figure 1:
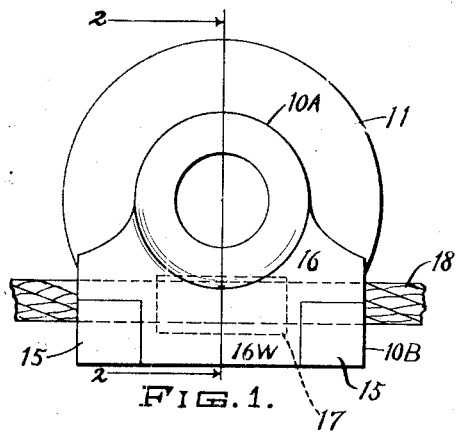
Fig. 1 is a front elevation of our device in a form in which a cable is suspended from a level below bore for the bracket bolt and Fig. 2 is a sectional elevation about as on line 2—2 in Fig. 1.

Referring to the drawing by reference numerals, 10 designates a horizontal tubular member having a suitable flange 11 to be placed against a telephone pole 12 and 13 is a suitable bolt in the bore of the tubular member 10 and fixed in the post 12, the threaded end of said bolt protruding from the outer end of the member 10 where a nut 14 is placed on the bolt.

Figure 6:
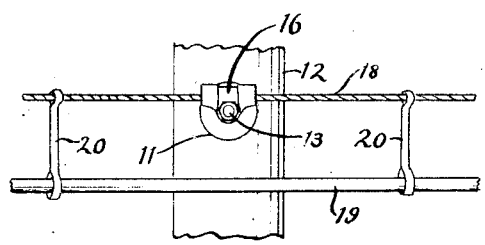
Fig. 6 is a front elevation of one of our cable brackets in reduced scale, and in operative position on a telephone pole.

The outer end of member 10 may also be flanged as $10^A$ said flanged part being enlarged at one side of the bore as at $10^B$, said latter enlargement preferably having two spaced outwardly projecting lugs 15 between which is removably retained the wing $16^W$ of a cap member 16 bored at $16^B$ concentric of the bore of member 10. This cap has a grooved part $16^G$ registering with the groove $10^G$. 17 is a lead or other suitable soft metal, semi-bushing in the central part of groove $10^G$ and within which is laid a so-called messenger wire or cable 18 such as commonly used in telephone cable line service for suspending a main cable, as 19 in Fig. 6, by means of suitable hangers 20. It will now be readily understood that cable 18 is first laid in groove $10^G$ then cap 16 is clamped against it, the cable being partly pressed into the soft metal 17 by the clamping action when the nut 14 is screwed tight, and thus endwise slipping of the cable is also prevented.

Figure 2:
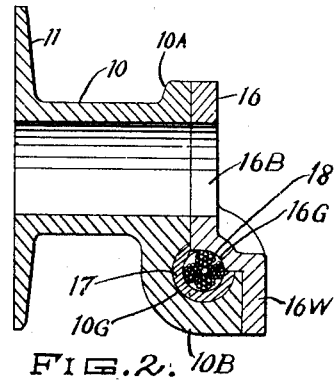
Figure 3:
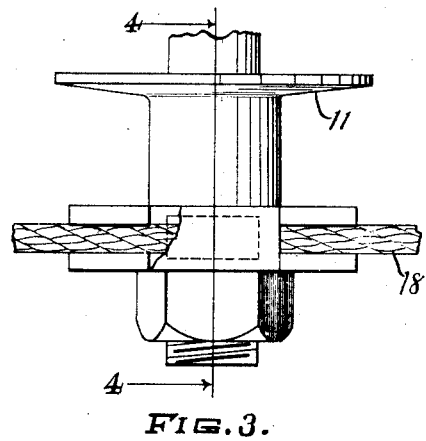
Fig. 3 is a top or plan view of our cable bracket having cable supporting and engaging means above the bracket bolt and Fig. 4 is a longitudinal sectional elevation about as on line 4—4 in Fig. 3.
Figure 4:
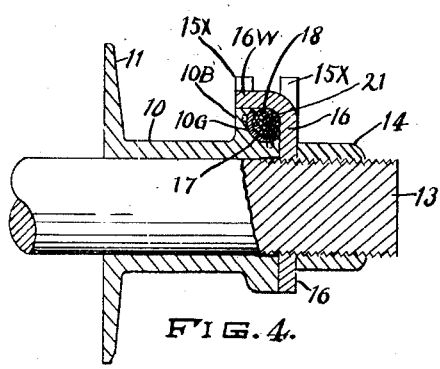
Figure 5:
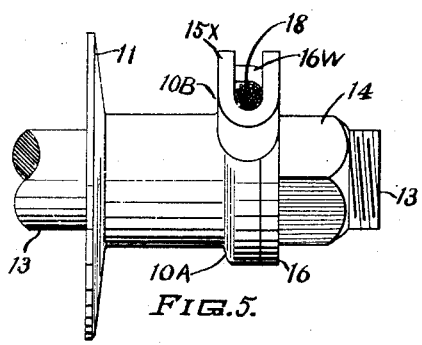
Fig. 5 is a side elevation of Fig. 3.

In means hitherto used for cable suspending, some parts come loose allowing the cable to fall from its fastenings and end slipping has also been a problem to contend with. In the form of my device shown in Figs. 1 and 2, the cable groove $10^G$ is literally in a ledge or corner formed at the junction of the outer face of member 10 and a horizontal ledge $10^L$ on the upper part of enlargement $10^B$, and thus if the cable clamp or cap 16 should accidentally become loose, the cable rests in its groove and cannot drop away from the bracket. In Figs. 3, 4 and 5, the cable engaging and clamping means described are above the bolt 13 and the wing part $16^W$ of the cap 16 is bent to horizontal plane forming an inward curvature at 21 which engages and squeezes the cable between it and within the groove $10^G$ when cap 16 is clamped inwardly by the nut 14. In this latter type of bracket, there is further provision for preventing cable 18 from falling down because the cable engaging parts are above the bolt and should the cap 16 be loose or even drop off, the cable will have a tendency to stay in groove $10^G$ and become at least partly imbedded in the soft metal 17. If the cable is accidentally dislodged from its grooved bearing, it will merely drop to and rest on the protruding part of the bolt 13. In said Figs. 3, 4 and 5, it will be noted that the end parts $15^X$, corresponding to 15 in Figs. 1 and 2, are of U-shape and opening upwardly, the cable 18 being laid within the channel-like opening thus formed.

We claim:

A cable hanger bracket comprising a horizontal bushing with a flange at one end and an enlargement at its other end with an open cable receiving groove arranged transversely of the bore of said bushing and in spaced relation to said bore and a cap having an aperture for alinement concentrically with the bore of said bushing, an offset in said cap having a grooved part registering with said cable receiving groove in the bushing, said bushing and cap adapted to receive a bolt or like securing means with a threaded part projecting outwardly of said cap, a nut threaded on said projecting bolt end and adapted to clamp the said cap toward the face of said bushing and simultaneously clamp a cable in said grooved parts, said cable receiving part of the bushing comprising an upwardly opening U-shaped two part projection above the bore of said bushing and said cap provided with an inwardly directed wing jaw adapted to be pressed inwardly between the two parts of said U-shaped projection to clamp the cable.

In testimony whereof we affix our signatures.

ADOLPH J. TSCHIDA.
THEODORE T. TSCHIDA.